United States Patent
Singhal et al.

(10) Patent No.: US 8,196,105 B2
(45) Date of Patent: Jun. 5, 2012

(54) TEST FRAMEWORK FOR AUTOMATING MULTI-STEP AND MULTI-MACHINE ELECTRONIC CALENDARING APPLICATION TEST CASES

(75) Inventors: Ashish Kumar Singhal, Hyderabad (IN); Sai Shankar, Hyderabad (IN); Pankaj Lohumi, Hyderabad (IN); Rakesh Gupta, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1376 days.

(21) Appl. No.: 11/824,473

(22) Filed: Jun. 29, 2007

(65) Prior Publication Data

US 2009/0007072 A1 Jan. 1, 2009

(51) Int. Cl.
*G06F 9/44* (2006.01)
(52) U.S. Cl. .......................................................... 717/124
(58) Field of Classification Search .................... 717/124
See application file for complete search history.

(56) References Cited

U.S. PATENT DOCUMENTS

| | | | |
|---|---|---|---|
| 4,696,003 A | 9/1987 | Kerr et al. | 371/19 |
| 6,195,765 B1 | 2/2001 | Kislanko et al. | 714/38 |
| 6,349,393 B1 | 2/2002 | Cox | 714/38 |
| 6,360,268 B1 | 3/2002 | Silva et al. | 709/227 |
| 6,662,312 B1 | 12/2003 | Keller et al. | 714/38 |
| 6,766,477 B2 | 7/2004 | Grucci et al. | 714/38 |
| 7,020,574 B2 | 3/2006 | Eden et al. | 702/122 |
| 7,020,797 B2 | 3/2006 | Patil | 714/4 |
| 7,062,753 B1 | 6/2006 | Ward et al. | 717/124 |
| 7,398,469 B2 * | 7/2008 | Kisamore et al. | 717/124 |
| 7,519,953 B2 * | 4/2009 | Reissman et al. | 717/124 |
| 7,603,658 B2 * | 10/2009 | Subramanian et al. | 717/126 |
| 2004/0133880 A1 * | 7/2004 | Paternostro et al. | 717/124 |
| 2004/0143819 A1 | 7/2004 | Cheng et al. | 717/125 |
| 2007/0178843 A1 * | 8/2007 | Singh et al. | 455/67.11 |
| 2007/0234294 A1 * | 10/2007 | Gooding | 717/124 |
| 2008/0127093 A1 * | 5/2008 | Fernandez-Ivern et al. | 717/124 |
| 2008/0244523 A1 * | 10/2008 | Kelso | 717/124 |

OTHER PUBLICATIONS

Pettichord Bret, *Design for Testability*, http://www.io.com/~wazmo/papers/design_for_testability_PNSQC.pdf, Abstract, 2002, 28 pages.
Software Testing Automation Framework (STAF), http://staf.sourceforge.net/index.php, Feb. 6, 2007, 3 pages.
Hall, Robert J., *Specification, Validation, and Synthesis of Email Agent Controllers: A Case Study in Function Rich Reactive System Design*, AT&T Labs Research, http://deliverv.acm.org/10.1145/360000/351126/p13-hall.pdf?key1=351126&key2=1816570711&coll=GUIDE&dl=GUIDE&CFID=13660265&CFTOKEN=72907613, 11 pages.

* cited by examiner

*Primary Examiner* — Wei Zhen
*Assistant Examiner* — Junchun Wu
(74) *Attorney, Agent, or Firm* — Merchant & Gould (57) ABSTRACT

A test framework for automating multi-user, multi-step and/or multi-machine test cases for electronic calendaring application objects is provided. Test cases may be automated where coordination between a number of machines is required to test electronic calendaring application user scenarios. In addition, automation of multifold interaction between two electronic calendaring application users is provided.

20 Claims, 4 Drawing Sheets

TEST FRAMEWORK FOR AUTOMATING MULTI-STEP AND MULTI-MACHINE ELECTRONIC CALENDARING APPLICATION TEST CASES

BACKGROUND

In an electronic calendaring application, two users can be configured on the same machine and under the same user login. For example, user A can configure the profile of user A and user B. This enables the testing of a multi-user scenario of an electronic calendaring application with the logon and logoff to different user profiles. But, in some cases it is not possible to configure calendaring application profiles for multiple users in a single user login. To test the multiple user scenarios in such cases, users must be configured under different machine (computer) logins. Both calendaring application profiles must be configured in the same machine under their respective user logins. For example, if it is desired to use a profile of user A, then a first login is performed as user A into the machine and a second login is performed for user B. Under this approach, a logoff and login to the machine and to the calendaring application must be performed for each step of a test case which is a heavy processing and time consuming task. In addition, a separate controller may be needed to control the machine logoff and logon.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing automation of electronic calendaring application test cases where coordination between a number of machines is required to test user scenarios. According to one embodiment, automation of multifold interaction between two electronic calendaring application users is provided.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to automated testing of multiple-user, multiple-step electronic calendaring application testing across a plurality of computing devices. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 4:
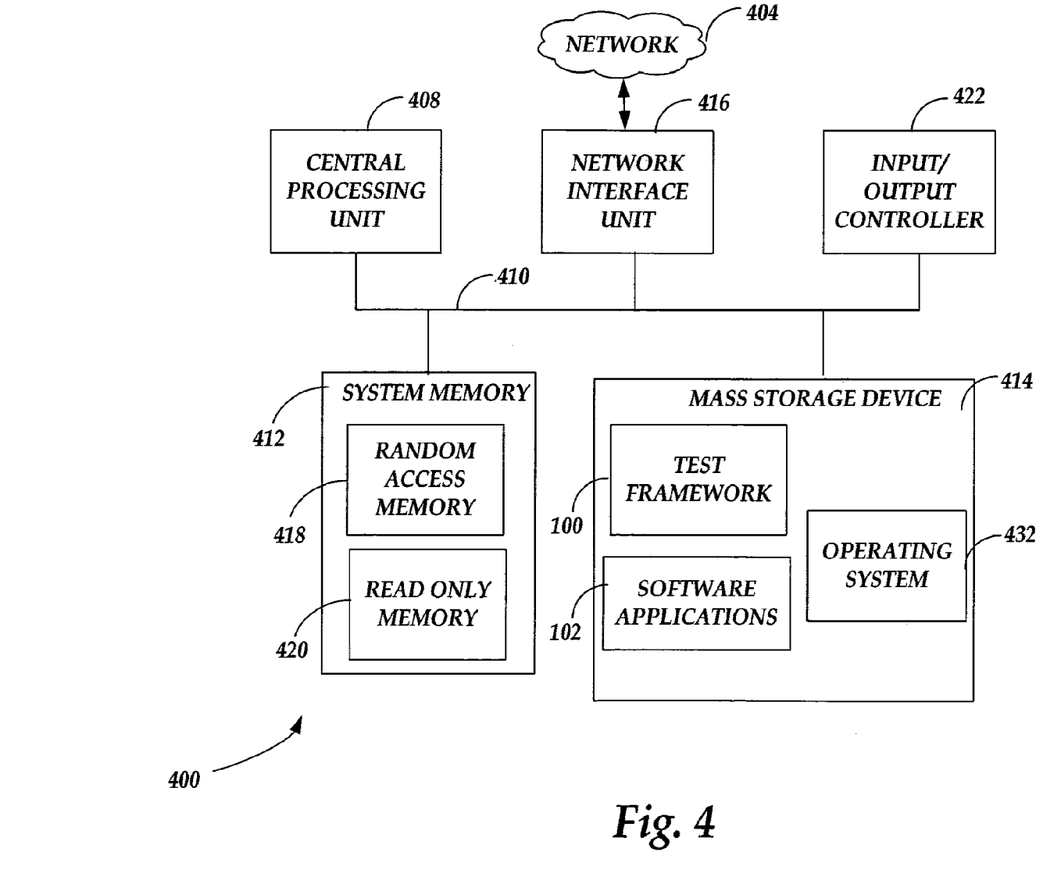
FIG. 4 is a simplified block diagram illustrating an example computing operating environment in which embodiments of the invention may be practiced.

According to an embodiment, a test framework for automating multi-user, multi-step test cases across a plurality of machines (computing devices) for electronic calendaring application objects is provided. Test cases may be automated where coordination between a number of machines is required to test electronic calendaring application user scenarios. In addition, automation of multifold interaction between two electronic calendaring application users is provided. As will be described below, user profiles for an electronic calendaring application are configured on different machines (computing devices) 400 and a generic interface is provided for transferring data/status for test case steps between the different machines. Thus, an interaction between two or more users in multiple test case steps is automated.

Consider the following example test case that may be processed according to an embodiment of the invention. User A and User B are employees of a given company and are working on an assigned project. User A wants to organize a meeting with User B to discuss the project. The following example calendaring steps may be performed between the two users, and according to embodiments, testing of the proper processing of each step may be desired.

User A:
Create a meeting request;
Associate meeting with a line of business (LOB) application or data; and
Send meeting request to User B.
User B:
Accept the meeting request from User A; and
User B decides to associate meeting with a line of business (LOB) application or data.
User A modifies meeting:
Update the meeting request time;
Send updated meeting request to User B; and
Automatic update request is sent to the line of business (LOB) application or data associated with User A.
User B:
Accept the updated meeting request; and
Automatic update request is sent to LOB or data associated with User B.

As can be seen from the example test case, illustrated above, a number of test challenges are presented, including the following: 1) users are on different machines; 2) the example test case involves multiple steps; and 3) verification is needed in several steps. For example, verification may be desired that the meeting request from User A is received at User B and that any time zone differences between a physical location of User A and User B are accounted for at User B's calendaring application. In addition, as set out above, both User A and User B may associate the meeting request to a line of business application and associated data. For example, the meeting request may be automatically associated with a time/ production monitoring application used by the employer of Users A and B to track employee utilization in terms of productivity and time spent on different projects for one or more customers of the employer. At each of these example steps, verification may be needed to determine whether the data is properly transferred between machines and that updates to the data are properly processed for the associated electronic calendaring application and for any LOB applications and associated data associated with the calendaring operation by one or more of the users.

Figure 1:
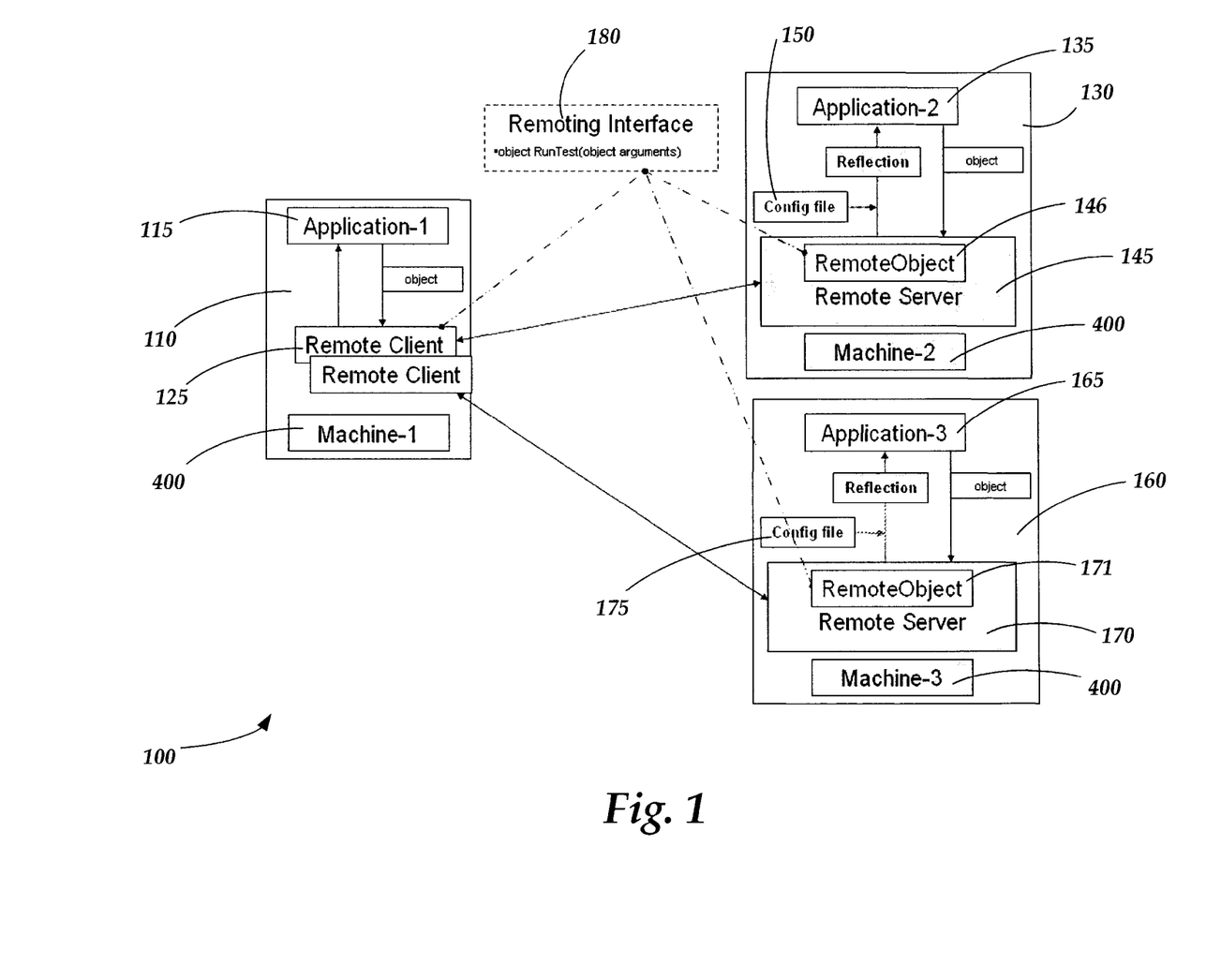
FIG. 1 illustrates a test framework for automating multi-step and multi-machine test cases for electronic calendaring application objects

FIG. 1 illustrates a test framework for automating multi-user, multi-step and multi-machine test cases for electronic calendaring application objects. The test framework 100 enables the passing of a test case object, for example, a meeting request from a first user and associated application and computer to a second or other user and associated application and computer for causing the test case to be executed at the second or other application an computer and for causing information responsive to the test case to be returned to the first or sending application and computer. According to one embodiment, the test framework 100 may be enabled with .NET Remoting from MICROSOFT CORPORATION that allows for the communication between objects that run in disparate applications (processes) across disparate computing devices over a distributed computing network, such as an intranet or the Internet. As described below, a remoting object in the form of a test case may be passed from a sender application and machine to a receiving application and machine for requesting processing of the test case at the receiving application and machine followed by a return of test case data/results to the sender application/machine.

According to an embodiment, .NET Reflection, from MICROSOFT CORPORATION, also may be employed to enable the test framework 100, illustrated in FIG. 1. According to .NET Reflection, the test framework 100 operation of the test framework 100 is managed to include the loading of test case application modules (also referred to as "assemblies") into an appropriate application domain and controlling memory layout of the type hierarchy defined within each assembly. Assemblies may contain application modules, modules may in turn contain types, and types may in turn contain members. Reflection may provide objects, such as calendaring application test cases that encapsulate assemblies, modules and types. Reflection may be used to dynamically create an instance of a type, as described below, bind the type to an existing calendaring application object or get the type from an existing object. Reflection may be used to invoke the type's methods or access its fields and properties across disparate applications and machines as illustrated in FIG. 1. According to one embodiment, Reflection is a mechanism of discovering object class information at runtime. As should be appreciated, the test framework 100, illustrated in FIG. 1, and described above in terms of a .NET Remoting and Reflection embodiment, is for purposes of example only and may be enabled by other suitable inter-process communications systems, including Distributed Component Object Model (DCOM) based inter-process communications systems and a variety of web services based inter-process communications systems.

Referring still to FIG. 1, the example test framework 100 illustrates a sender system 110 and two receiver systems 130 and 160. As will be appreciated, a single receiver system may be included or many receiver systems may be included. Each of the sender and receiver systems 110, 130 and 160 include an application, 115, 135, 165, respectively which may comprise software applications requiring testing as described herein. For example, according to one embodiment, the applications 115, 135, 165 may include electronic calendaring applications, such as OUTLOOK from MICROSOFT CORPORATION, for which multi-user, multi-step and/or multi-machine testing is desired as described for the example meeting request illustration set out above. Each of the sender and receiver systems includes a computer 400, as described below with reference to FIG. 4. According to embodiments, each of the sender and receiver systems may operate on the same computer 400, or each of the sender and receiver systems may operate on different computers that communicate with each other via a distributed computing network.

A remote client 125 is illustrated in the sender system 110. According to an embodiment, the remote client 125 is a software module, for example, a component of the application 115 operative to send a test case object to the receiver systems 130, 160 for processing a test case as described herein. The remote client 125 is operative to receive test data back from the receiver systems 130, 160. Referring to the receiver systems 130, 160, remote servers 145, 170 are illustrated and are software modules operative to receive and process remote test case objects sent from the sender system remote client 125. The remote servers 145, 170 are operative to act as remote clients for the respective receiver systems 130, 160 for sending test case data back to the remote client 125 of the sender system 110. The remote objects 146, 171 are software modules on the remote servers 145, 170 operative to process test cases at the receiver systems 130, 160, as described below with reference to FIGS. 2, 3.

According to embodiments, one or more assemblies (software modules) or data files in support of a given test case may be loaded on a remote machine 400. For example configuration (config) files 150, 175 are illustrated in the receiver systems 130, 160, respectively and may be loaded on the remote machines 400. According to embodiments, the configuration files may include information instructive to the remote test objects received from the sender remote client 125 as to how to process a given test case request. For example, after receipt of a test case object, as described below, the remote test objects may parse the configuration files 150, 175 to determine appropriate processing methods of the receiver applications 135, 165 that should be called in response to the received test case objects. The configuration files may be read by the framework 100 and appropriate methods may be called using the aforementioned .NET Reflection. In a configuration file 150, a tester may specify a test assembly to load, class to instantiate and a method to call on a machine when the Remoting Interface is being instantiated. For example, one or more dynamic link libraries (DLL) may be specified and loaded on a remote machine for processing a given test case.

Referring still to FIG. 1, each of the sender and receiver systems 110, 130, 160 comprising the test framework 100 communicate with each other via a common interface 180 enabled by the framework 100. As described above, additional sender/receiver systems and associated applications and computing devices 400 may join the test framework and communicate with each other via the interface 180. According to embodiments, the interface 180 comprises an application programming interface (API), referred to herein as a "Remoting Interface" 180 in the form of object RunTest (object arguments). The Remoting Interface 180 enables a sender machine 400 that initiates a test case by sending test case specific parameters to receiver machine(s) 400 in receiver systems 130, 160. The initiating sender machine 400 of the sender system 110 may wait for the receiver machines to execute portions of the test case and poll the results back to the sender machine. Passing data of type "object" makes this Remoting Interface 180 generic to use across various test cases and across various users and systems 130, 160 in which different machines coordinate to execute a multi-step test case, and the data that may be exchanged between the test machines may vary from machine to machine.

A number of test scenarios may be automated via the generic interface described above. The calling and called applications may be application domains of any type (for example, WINDOWS based forms applications, Console applications, WINDOWS based services applications, web services applications, and the like). Calling (sender) and called (receiver) applications may send arguments in the RunTest (object arguments) API and may receive (as return type) any type. By having multiple listener applications running on multiple machines, a single test case may span across multiple machines. The calling (sender) application may act as a controller and may make synchronous calls to the called (receiver) applications in a predefined order where each call returns a success or failure.

Figure 2:
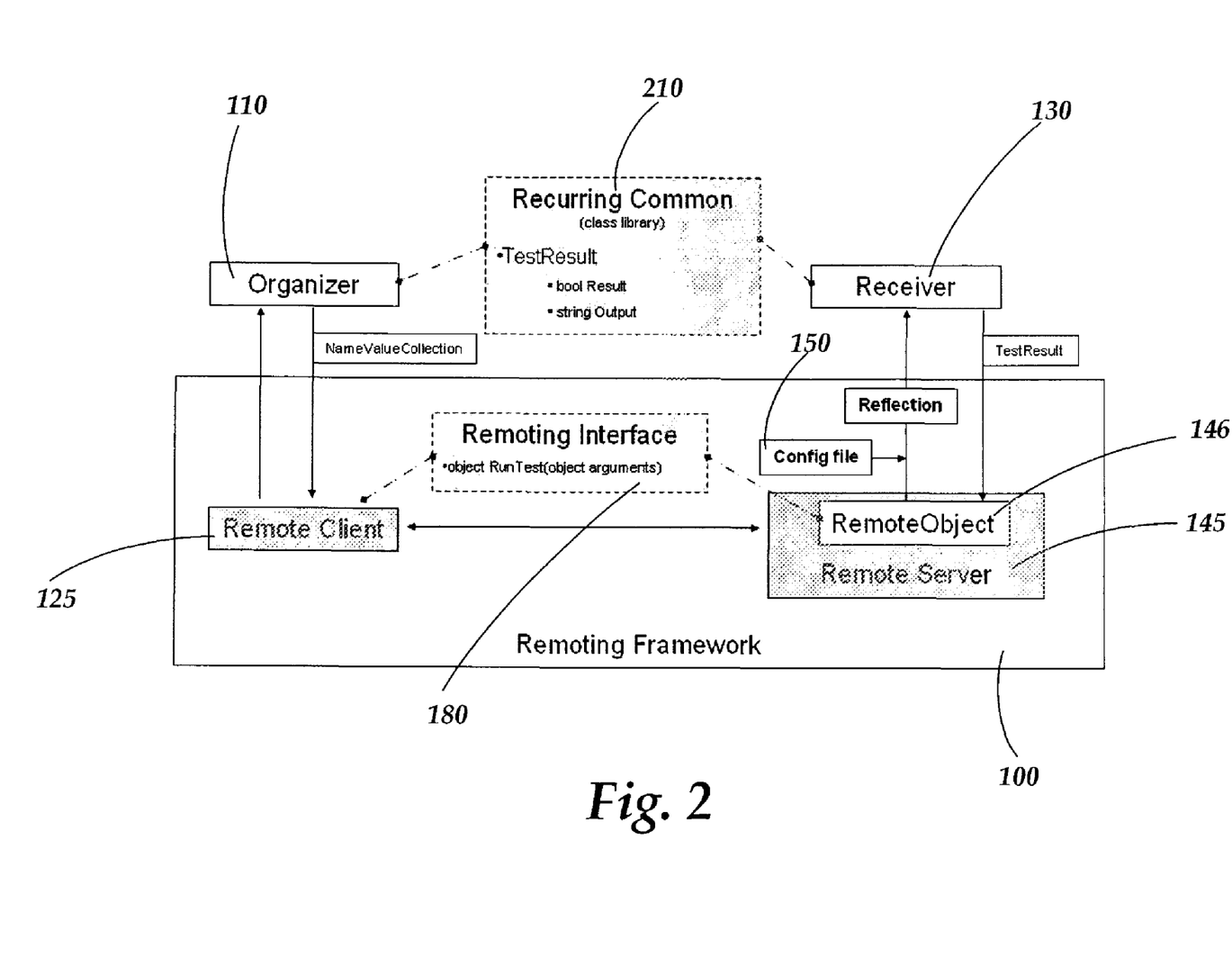
FIG. 2 illustrates a test framework for automating multi-step and multi-machine test cases for electronic calendaring application objects according to an example operation.

FIG. 2 illustrates an example test case run according to embodiments of the present invention. The components illustrated in FIG. 2 are described above with reference to FIG. 1. FIG. 2 is described below in terms of a logical flow diagram illustrating a method for multi-step, multi-user and multi-machine testing for an electronic calendaring application illustrated in FIG. 3.

Figure 3:
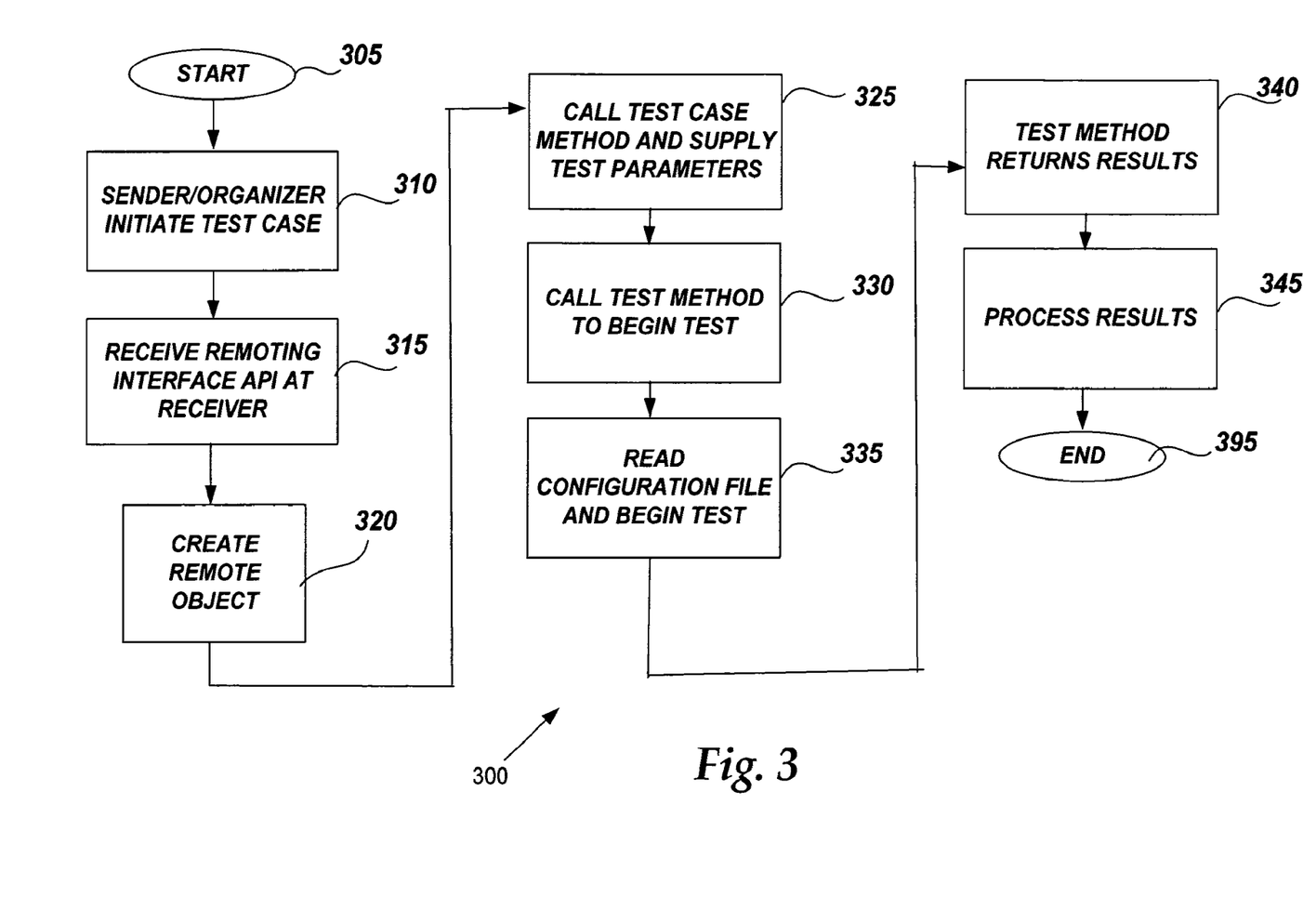
FIG. 3 is a logical flow diagram illustrating a method for multi-step, multi-user and multi-machine testing for an electronic calendaring application.

For purposes of description of FIGS. 2 and 3, consider an example test case using DUET, a collaborative application of MICROSOFT and SAP to allow information workers to interact with enterprise-type applications. According to the following example test case, consider a requirement to test a DUET specific feature that involves a user (called Organizer hereafter) to use an electronic calendaring application automation feature, for example, a MICROSOFT OUTLOOK automation feature, to create a meeting request and to send the meeting request to another user (called Receiver hereafter) who will accept the meeting request. A set of high level test case steps are illustrated below.

At Organizer:
Create a meeting request; and
Perform some DUET specific steps that require validation.
At Receiver:
Accept the meeting request; and
Perform some DUET specific steps that require validation.
At Organizer:
Update the meeting request created earlier and send the update to the receiver; and
Perform some DUET specific steps that require validation.
At Receiver:
Accept the update; and
Perform some DUET specific steps that require validation.

As can be seen from the foregoing test case steps, and as illustrated in FIG. 2, the organizer and receiver are two different users who have their calendaring application profiles configured on two different computing devices 400 (machines). Without the benefit of embodiments of the invention, for execution of the above example test case, two different applications need to run on these computing devices that execute their respective portions of the test case. The two applications must execute one after the other in the order of the test case steps listed above and must collectively decide the result of the test case.

Referring to FIG. 3, according to embodiments, the test routine 300 begins at start operation 305 and proceeds to operation 310 where, the organizer (sending system 110) initiates the test case by sending the object RunTest (object arguments) API via the Remoting Interface 180 to the receiver system 130. According to one embodiment, the remote method passed to the receiver system 130 takes as an argument System. Object and returns System. Object. Thus, the organizer and receiver applications 115, 135 may agree on the type that they can send and receive.

At operation 315 the Remoting Interface API 180 is received by the receiver system 130 and the remote server 145 begins running at the receiver application 135 for processing the received test object. At operation 320, the organizer 110 creates an object (RemoteClient) of remote client 125. At operation 325 the organizer 110 calls a test case method (RunTest) and supplies test-specific parameters, in the form of a NameValueCollection as an argument, which contains complete details of the test case, including the need to run at the receiver application, the steps that need to be run, and all additional test information in name/value pairs that may be of use to the receiver application to run properly. That is, the arguments of the API include the test-specific parameters specified by the organizer/sender that need to be processed at the receiver system 130.

At operation 330, the RemoteClient object 125 calls the test method on RemoteObject 146 of the remote server 145 (synchronously). At operation 335, the RemoteObject on the remote server reads a configuration (config) file 150, creates a test case instance, for example, via .NET Reflection described above, calls the appropriate test method, as defined in the configuration file 150, and passes to the test method the argument that is received from the client application via the Remoting Interface API. This method call contains implementation of the test case portion that needs to run on the receiver system 130.

At operation 340, the test method returns an object 210 of type TestResult which may contain a Boolean value to indicate pass/failure of the step that was run plus any console output (as a displayable string) that may need to be passed back to the organizer. According to embodiments, the recurring common data (class library) 210 is illustrated if FIG. 2 for test result data exchanged between the organizer (calling) system 110 and the receiver (called) system 130. At operation 345, control is returned back to the organizer system 110, and the user/organizer of the organizer system 110 may examine the test results. If desired, the user/organizer may process/log test output, as desired.

As an example of the above, if the user/organizer desires to test whether a time zone difference is accounted for at the receiving system 130 when a meeting request is accepted by the receiver, a test method may be passed to the receiving system 130, as described above to verify that, if the receiving system operates in a time zone one hour later than the sending system, a meeting request accepted at the receiving system will account for the time zone difference. According to embodiments, this test parameter will be passed to the receiving system 130, and if the time zone difference is accounted for when the meeting request is accepted, then a Boolean test result of "pass" may be returned to the user/organizer. A similar test may be run to determine whether data in an associated LOB system, for example, an employee productivity monitoring system, is notified and updated based on an accepted meeting request at the receiving system 130.

Operating Environment

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 400 comprises a general purpose desktop, laptop, handheld, mobile or other type of computer (computing device) capable of executing one or more application programs. The computer 400 includes at least one central processing unit 408 ("CPU"), a system memory 412, including a random access memory 418 ("RAM") and a read-only memory ("ROM") 420, and a system bus 410 that couples the memory to the CPU 408. A basic input/output system containing the basic routines that help to transfer information between elements within the computer, such as during startup, is stored in the ROM 420. The computer 402 further includes a mass storage device 414 for storing an operating system 432, application programs, and other program modules.

The mass storage device 414 is connected to the CPU 408 through a mass storage controller (not shown) connected to the bus 410. The mass storage device 414 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed or utilized by the computer 400.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 400.

According to various embodiments of the invention, the computer 400 may operate in a networked environment using logical connections to remote computers through a network 404, such as a local network, the Internet, etc. for example. The computer 402 may connect to the network 404 through a network interface unit 416 connected to the bus 410. It should be appreciated that the network interface unit 416 may also be utilized to connect to other types of networks and remote computing systems. The computer 400 may also include an input/output controller 422 for receiving and processing input from a number of other devices, including a keyboard, mouse, etc. (not shown). Similarly, an input/output controller 422 may provide output to a display screen, a printer, or other type of output device.

As mentioned briefly above, a number of program modules and data files may be stored in the mass storage device 414 and RAM 418 of the computer 400, including an operating system 432 suitable for controlling the operation of a networked personal computer, such as the WINDOWS® operating systems from MICROSOFT CORPORATION of Redmond, Wash. The mass storage device 414 and RAM 418 may also store one or more program modules. In particular, the mass storage device 414 and the RAM 418 may store application programs, such as a software application 424, for example, a word processing application, a spreadsheet application, a slide presentation application, a database application, etc.

According to embodiments of the present invention, a test framework 100 for automating multi-step and multi-machine test cases for electronic calendaring application objects, as described above. Other applications 102 include a variety of software applications that may be utilized according to embodiments of the invention, for example, an electronic calendaring application such as MICROSOFT OUTLOOK, described above, and a collaborative application such as DUET from MICROSOFT and SAP, described above.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A computer readable storage medium containing computer readable instructions which when executed by a computer perform a method of automating multi-step and multi-machine test cases for electronic calendaring application objects, the method executed by the computer readable instructions comprising:

receiving a test case at a receiving electronic calendaring application;

creating a test case instance at the receiving electronic calendaring application responsive to the received test case, wherein creating the test case instance comprises creating the test case instance according to a configuration file specifying a test assembly to load, a class to instantiate, and a method-call associated with the test case;

executing the test case at the receiving electronic calendaring application; and returning test case execution results from the receiving electronic calendaring application to a sending electronic calendaring application from which the test case was received.

2. The computer readable storage medium of claim 1, wherein receiving the test case at the receiving electronic calendaring application includes receiving the test case via an object RunTest (object arguments) application programming interface (API), the API including at least one test parameter to be run on the receiving electronic calendaring application.

3. The computer readable storage medium of claim 2, wherein receiving the test case via the object RunTest (object arguments) application programming interface (API), the API including the at least one test parameter to be run on the receiving electronic calendaring application includes receiving the at least one test parameter in the form of a NameValueCollection as an argument of the API, the NameValueCollection containing the at least one test case parameter.

4. The computer readable storage medium of claim 2, wherein receiving the test case via the object RunTest (object arguments) application programming interface (API) includes receiving the test case via the object RunTest (object arguments) application programming interface (API) via a Remoting Interface operative to pass the API from the sending electronic calendaring application to the receiving electronic calendaring application.

5. The computer readable storage medium of claim 4, wherein receiving the test case via the object RunTest (object arguments) application programming interface (API) via a Remoting Interface operative to pass the API from the sending electronic calendaring application to the receiving electronic calendaring application includes receiving the API from a remote client object at the sending electronic calendaring application.

6. The computer readable storage medium of claim 1, wherein creating the test case instance at the receiving electronic calendaring application responsive to the received test case includes creating the test case instance at the receiving electronic calendaring application responsive to the at least one test case parameter.

7. The computer readable storage medium of claim 6, prior to creating the test case instance at the receiving electronic calendaring application responsive to the at least one test case parameter, reading the configuration file associated with the receiving electronic calendaring application to determine the test case instance required for executing the test case at the receiving electronic calendaring application.

8. The computer readable storage medium of claim 1, wherein returning the test case execution results from the receiving electronic calendaring application to the sending electronic calendaring application from which the test case was received includes returning the test case execution results from the receiving electronic calendaring application to the sending electronic calendaring application from which the test case was received as a test results object of a type TestResult.

9. The computer readable storage medium of claim 1, wherein returning the test case execution results from the receiving electronic calendaring application to the sending electronic calendaring application from which the test case was received includes returning the test case execution results from the receiving electronic calendaring application to the sending electronic calendaring application from which the test case was received as a pass or fail test result.

10. A computer readable storage medium containing computer readable instructions which when executed by a computer perform a method of automating multi-step and multi-machine test cases for electronic calendaring application objects, the method executed by the computer readable instructions comprising:
   receiving a test case from a sending electronic calendaring application at a receiving electronic calendaring application via a .NET Remoting framework;
   referencing a configuration file associated with the test case, the configuration file specifying a test assembly to load, a class to instantiate, and a method-call associated with the test case;
   creating, based on the configuration file, a test case instance at the receiving electronic calendaring application responsive to the received test case via a .NET Reflection framework;
   executing the test case at the receiving electronic calendaring application; and
   returning test case execution results from the receiving electronic calendaring application to the sending electronic calendaring application as one of the following: a pass test result and a fail test result.

11. The computer readable storage medium of claim 10, wherein receiving the test case at the receiving electronic calendaring application includes receiving the test case via an object RunTest (object arguments) application programming interface (API), the API including at least one test parameter to be run on the receiving electronic calendaring application.

12. The computer readable storage medium of claim 11, wherein receiving the test case via the object RunTest (object arguments) application programming interface (API), the API including the at least one test parameter test parameters to be run on the receiving electronic calendaring application includes receiving the at least one test parameter in the form of a NameValueCollection as an argument of the API, the NameValueCollection containing the at least one test parameter.

13. The computer readable storage medium of claim 11, wherein receiving the test case via the object RunTest (object arguments) application programming interface (API) includes receiving the test case via the object RunTest (object arguments) application programming interface (API) via a Remoting Interface operative to pass the API from the sending electronic calendaring application to the receiving electronic calendaring application.

14. The computer readable storage medium of claim 13, wherein receiving the test case via the object RunTest (object arguments) application programming interface (API) via a Remoting Interface operative to pass the API from the sending electronic calendaring application to the receiving electronic calendaring application includes receiving the API from a remote client object at the sending electronic calendaring application.

15. The computer readable storage medium of claim 10, wherein creating the test case instance at the receiving electronic calendaring application responsive to the received test case includes creating the test case instance at the receiving electronic calendaring application responsive to the at least one test parameter.

16. The computer readable storage medium of claim 15, prior to creating the test case instance at the receiving electronic calendaring application responsive to the at least one test parameter, reading the configuration file associated with the receiving electronic calendaring application to determine the test case instance required for executing the test case at the receiving electronic calendaring application.

17. A method of automating multi-step and multi-machine test cases for electronic calendaring application objects, the method comprising:

receiving a test case at a receiving electronic calendaring application;

creating a test case instance at the receiving electronic calendaring application responsive to the received test case, wherein creating the test case instance comprises creating the test case instance according to a configuration file specifying a test assembly to load, a class to instantiate, and a method-call associated with the test case;

executing the test case at the receiving electronic calendaring application; and returning test case execution results from the receiving electronic calendaring application to a sending electronic calendaring application from which the test case was received.

18. The method of claim 17, wherein receiving the test case at the receiving electronic calendaring application includes receiving the test case via an object RunTest (object arguments) application programming interface (API), the API including at least one test parameter to be run on the receiving electronic calendaring application.

19. The method of claim 18, wherein receiving the test case via the object RunTest (object arguments) application programming interface (API), the API including the at least one test parameter to be run on the receiving electronic calendaring application includes receiving the at least one test parameter in the form of a NameValueCollection as an argument of the API, the NameValueCollection containing the at least one test case parameter.

20. The method of claim 18, wherein receiving the test case via the object RunTest (object arguments) application programming interface (API) includes receiving the test case via the object RunTest (object arguments) application programming interface (API) via a Remoting Interface operative to pass the API from the sending electronic calendaring application to the receiving electronic calendaring application.

* * * * *